United States Patent
Lee et al.

(10) Patent No.: US 12,547,515 B2
(45) Date of Patent: Feb. 10, 2026

(54) RUN-TIME MODIFICATION OF DATA MONITORING PLATFORM METRICS

(71) Applicant: Oracle International Corporation, Redwood Shores, CA (US)

(72) Inventors: Vivian Qian Lee, Berkshire (GB); Hugo Alexandre Pereira Monteiro, London (GB)

(73) Assignee: Oracle International Corporation, Redwood Shores, CA (US)

(*) Notice: Subject to any disclaimer, the term of this patent is extended or adjusted under 35 U.S.C. 154(b) by 570 days.

(21) Appl. No.: 17/719,705

(22) Filed: Apr. 13, 2022

(65) Prior Publication Data

US 2023/0222043 A1    Jul. 13, 2023

Related U.S. Application Data

(60) Provisional application No. 63/299,327, filed on Jan. 13, 2022.

(51) Int. Cl.
*G06F 11/30* (2006.01)
*G06F 16/22* (2019.01)

(52) U.S. Cl.
CPC ...... *G06F 11/3068* (2013.01); *G06F 16/2228* (2019.01)

(58) Field of Classification Search
CPC ................. G06F 11/3068; G06F 16/2228
See application file for complete search history.

(56) References Cited

U.S. PATENT DOCUMENTS

| | | | |
|---|---|---|---|
| 9,367,515 B1 * | 6/2016 | Myers | G06F 1/3246 |
| 11,392,393 B2 * | 7/2022 | Bolik | G06F 9/44505 |
| 11,720,555 B1 * | 8/2023 | Snyder | G06Q 30/0201 |
| | | | 707/609 |
| 2019/0018675 A1 * | 1/2019 | Ang | G06F 40/205 |
| 2022/0308544 A1 * | 9/2022 | Wilde | H04L 67/12 |

* cited by examiner

*Primary Examiner* — Van H Oberly
*Assistant Examiner* — Brooks T Hale
(74) *Attorney, Agent, or Firm* — Invoke

(57) ABSTRACT

Techniques for creating a custom metric type to be added to a set of metrics generated by a data monitoring platform at run-time are disclosed. A system receives values defining properties of a custom metric type based on a custom metric template and a custom schema template. The system generates an instruction set, based on the values associated with the custom metric template, for generating the custom metric type on an executing data monitoring system. The system validates the instruction set and the custom schema to verify that the definitions for the custom metric type and the custom schema may be executed by the data monitoring system. The system adds the custom metric type, at run-time, to a set of metrics generated by the data monitoring system.

20 Claims, 5 Drawing Sheets

RUN-TIME MODIFICATION OF DATA MONITORING PLATFORM METRICS

BENEFIT CLAIMS; RELATED APPLICATIONS; INCORPORATION BY REFERENCE

This application claims the benefit of U.S. Provisional Patent Application 63/299,327, filed Jan. 13, 2022, which is hereby incorporated by reference. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to creating custom metrics for a data monitoring platform at run-time. In particular, the present disclosure relates to creating a custom metric type for a data monitoring platform while the data monitoring platform is executing, by providing the data monitoring platform with a custom schema for the custom metric type.

BACKGROUND

In data monitoring systems, the metrics that are generated by the data monitoring platform are typically defined prior to run-time. For example, an enterprise that supplies the data monitoring system to customers may define the metrics. In addition, a developer may code the instruction set for the data monitoring platform for the metrics. The system compiles and deploys the data monitoring platform to perform the data monitoring for a defined set of metrics based on defined types in a data set.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
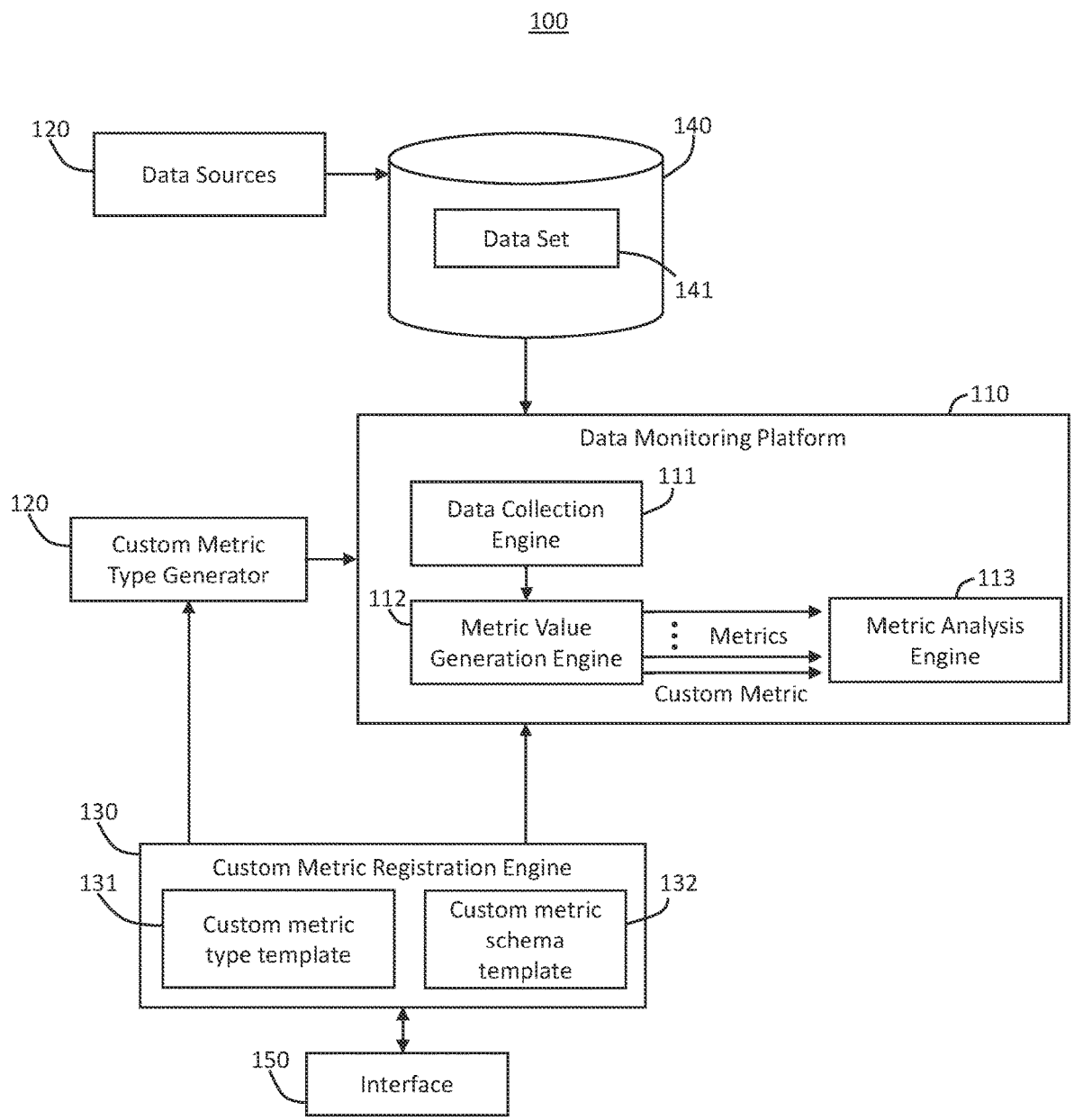
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. GENERATING CUSTOM METRICS IN A CURRENTLY-EXECUTING DATA MONITORING PLATFORM
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

A system includes a data monitoring platform that monitors data values of a monitored data set and generates values for metrics based on the data values.

One or more embodiments generate a custom metric type that is added to a set of metrics generated by the data monitoring platform at run-time without terminating the ongoing execution of the data monitoring platform. For example, the system may generate a set of existing metrics by executing a corresponding set of metrics-calculation processes from a process queue. One or more embodiments generate, at run-time, a custom metric process that is added to the process queue to generate custom metric values for the custom metric.

A system stores a custom metric template and a custom schema template for generating a custom metric type for the executing data monitoring system. The system receives values for data specified in the custom metric template to generate an instruction set for calculating the custom metric template. As an example, the system may receive the data for the templates via a POST command to a Representational State Transfer (REST) endpoint. The system validates the instruction metric set to verify that classes specified in the instruction set exist and are accessible by the data monitoring platform. The system may further validate a formula or calculation defined by the instruction set. The system additionally validates a value type specified for the custom metric. The system validates the custom schema to verify that a format of the custom schema is a format consistent with a language understandable by the executing data monitoring system, to modify functionality of the executing data monitoring system. The system generates a custom metric type based on the validated information. Examples herein refer to a custom metric type corresponding to the Java programming language, however, persons or ordinary skill in the art will appreciate that the type may correspond to any similar construct in other programming languages.

One or more embodiments add the validated custom metric type to the existing set of metrics generated by the data monitoring system. The system may add the validated custom metric type to the existing set of metrics generated by the data monitoring system without re-compiling or redeploying code for the data monitoring system. The system may generate one or both of an object (such as a Java object), dataset, and/or a REST resource associated with the custom metric based on the custom schema. Upon adding the validated custom metric type to the existing set of metrics, the custom metric type has the same type of functionality as the existing metrics. For example, the system may call, analyze values of, and perform calculations with a Java object associated with a custom metric in a same manner as Java objects associated with existing metrics.

One or more embodiments provide the templates for the custom metric and the custom schema to a custom metric registration engine. The custom metric registration engine is accessible by a user via a user interface to generate the custom metric type definition. For example, the custom metric registration engine may generate a series of prompts to prompt a user to provide values for a name of a custom metric type, fields from which data will be collected to generate values for the custom metric, any calculations applied to the collected data to generate the custom metric, and a value type for the custom metric. In one embodiment, the interface may present a visual representation of the custom metric template via a graphical user interface (GUI). A user may interface with the GUI to provide values for fields to define the custom metric type. The system may receive completed templates via REST endpoints.

One or more embodiments provide a data monitoring system with a set of instructions for generating a custom metric type. The set of instructions specify an operation which accepts one or more values as input parameters, an operator parameter to be applied to the values, and a return type of the operation. The system identifies the operation to be performed on the values based on the specified operation parameter.

One or more embodiments include an interface for customizing REST integrations. The interface uses a metric type template and a schema template to obtain inputs for values to define a custom metric type. The system validates the data obtained resulting from the metric type template and the structure of the schema template. The system translates the data obtained resulting from the metric type template into source code. The system applies the source code to a currently-executing data monitoring system that generates a currently-existing set of metrics to add the custom metric to the currently-existing set of metrics as metrics generated by the data monitoring system. The system generates one or both of a Java object and a REST resource for the custom metric based on the custom schema.

One or more embodiments allow a user to dynamically define custom metrics with or without custom code in a machine learning (ML) monitoring system or analytics platform, without modifying the source code of the ML monitoring system or analytics platform consuming those metrics and without modifying the source code of a metric collection engine. They system may implement validated code injection for defining the custom metrics where the code is provided via a user interface (UI). This embodiment(s) is advantageous over prior art systems because the custom metrics can be inserted as freely as code that reference any other raw or computed metric. The system may require the input to define or loosely define metric schema in JSON, which allows vectors and metrics of mixed types to be defined. The output of the system may be consumed by an analytics platform as a first-order (directly referenceable) metric to feed into ML algorithms or other forms of data analytics.

One or more embodiments described in this Specification and/or recited in the claims may not be included in this General Overview section.

2. Architectural Overview

FIG. 1 illustrates a system 100 in accordance with one or more embodiments. As illustrated in FIG. 1, system 100 includes a data monitoring platform 110, a custom metric type generator 120, and a custom metric registration engine 130. The data monitoring platform 110 monitors data, such as a data set 141 in a data repository 140. The data set 141 may be obtained from one or more data sources 120. Examples of data sources include computer systems, network devices, values stored in memory, sensor data, or any other data. In one or more embodiments, the data monitoring platform monitors data directly from data sources, without obtaining data from a data repository. The data may be time-series data from multiple different data sources.

In one or more embodiments, a data repository 140 is any type of storage unit and/or device (e.g., a file system, database, collection of tables, or any other storage mechanism) for storing data. Further, a data repository 140 may include multiple different storage units and/or devices. The multiple different storage units and/or devices may or may not be of the same type or located at the same physical site. Further, a data repository 140 may be implemented or may execute on the same computing system as the data monitoring platform. Alternatively, or additionally, a data repository 140 may be implemented or executed on a computing system separate from the data monitoring platform. A data repository 140 may be communicatively coupled to the data monitoring platform via a direct connection or via a network.

Information describing the data set 141 may be implemented across any of components within the system 100. However, this information is illustrated within the data repository 140 for purposes of clarity and explanation.

The data monitoring platform 110 includes a data collection engine 111 that obtains data values from the data set 141. The data collection engine 111 may sample the data at predetermined time intervals, such as every second, minute, or hour. The data collection engine 111 may also receive data and generate metric values asynchronously.

The data monitoring platform 110 includes a metric value generation engine 112 that generates metric values associated with defined metrics based on the collected data. Examples of metric values include: values obtained from fields in data objects stored in the data set and values obtained from one or more mathematical or logical formulae applied to values in fields in data objects.

For example, the data set 141 may include objects describing resources in a cloud computing environment. Each resource may be defined in the data set 141 by an identifier and one or more attributes, such as: memory available, data input, data output, operating state, application running, entities accessing resource, etc. The metric value generation engine 112 may access the values for the attributes stored in the objects to generate metrics associated with the data set 114, such as: memory usage over time, average data input/output, average data requests over time, application running time, etc.

In one or more embodiments, the metric value generation engine 112 includes software executed on a computer including a hardware processor. The software may include definitions for metric types and processes for obtaining metric values. The hardware processor executes the instructions in the software to identify values in fields of data objects in the data set associated with defined metric types and generate metric values based on the values in the fields of the objects in the data set. According to one embodiment, developing the metric value generation engine 112 includes programming code to specify one or more of the metrics to be generated. Developing the metric value generation engine 112 may include validating and compiling the code for generating the metrics together with the code specifying the data sources—such as attributes of data objects in the data set 141— used to generate the metrics. The metric value generation engine 112 begins generating the pre-configured metrics upon deployment.

A metric analysis engine 113 receives the metrics generated by the metric value generation engine 112. The metric analysis engine 113 analyzes the metrics to identify characteristics associated with the data set 141. For example, if the data set 141 describes a computing environment, the metrics analysis engine 113 analyzes the metrics to identify characteristics of the computing environment.

A custom metric registration engine 130 provides an interface for defining a custom metric and custom schema description. In one embodiment, the custom metric registration engine 130 stores a custom metric type template. The metric type template specifies data types required to configure a custom metric type. The custom metric type template may specify instructions for computing the custom metric type and the data types, including values obtained from data fields in data objects, used to compute the custom metric type. For example, a metric type template may specify the following required data to configure a new metric type: name, fields, calculation, value (e.g., type of output value). The custom metric generation engine 130 stores a custom metric schema template. The schema template specifies, in a language understandable by the data monitoring platform, fields of the custom metric type. For example, the schema template may include the name and type of the custom metric type.

In one or more embodiments, the custom metric registration engine 130 includes an application protocol interface (API), such as a Representational State Transfer (REST) API. The REST API may receive parameters associated with the custom metric type template and the custom metric schema template. The REST API may provide the values associated with the custom metric parameters to the custom metric generator 120 to generate a custom metric and to the metric analysis engine 113 to specify a metric to be analyzed by the metric analysis engine 113.

The custom metric type generator 120 generates the custom metric type based on a custom metric specification obtained from the custom metric registration engine 130. For example, the custom metric registration engine 130 may generate the custom metric specification based on custom metric parameters. The custom metric type generator 120 provides the custom metric type to the data monitoring platform 110. Using parameter values obtained based on the custom metric schema, the data monitoring platform 110 modifies an existing set of monitored metrics to include the custom metric type. In one embodiment, the data monitoring platform generates a Java object or a REST resource based on the custom metric schema.

An external terminal interfaces with the custom metric registration engine 130 via an interface 150. In one embodiment, the custom metric registration engine 130 provides the interface 150 with prompts based on the fields specified in the custom metric type template 131 and the custom schema template. For example, the custom metric registration engine 130 may prompt a user to provide a name, fields, and a formula for calculating a custom metric.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

In one or more embodiments, a data monitoring platform refers to hardware and/or software configured to perform operations described herein for generating values for defined metrics based on stored data and/or calculations or formulae applied to stored data. Examples of operations for generating a custom metric are described below with reference to FIG. 2.

In an embodiment, the data monitoring platform is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 2:
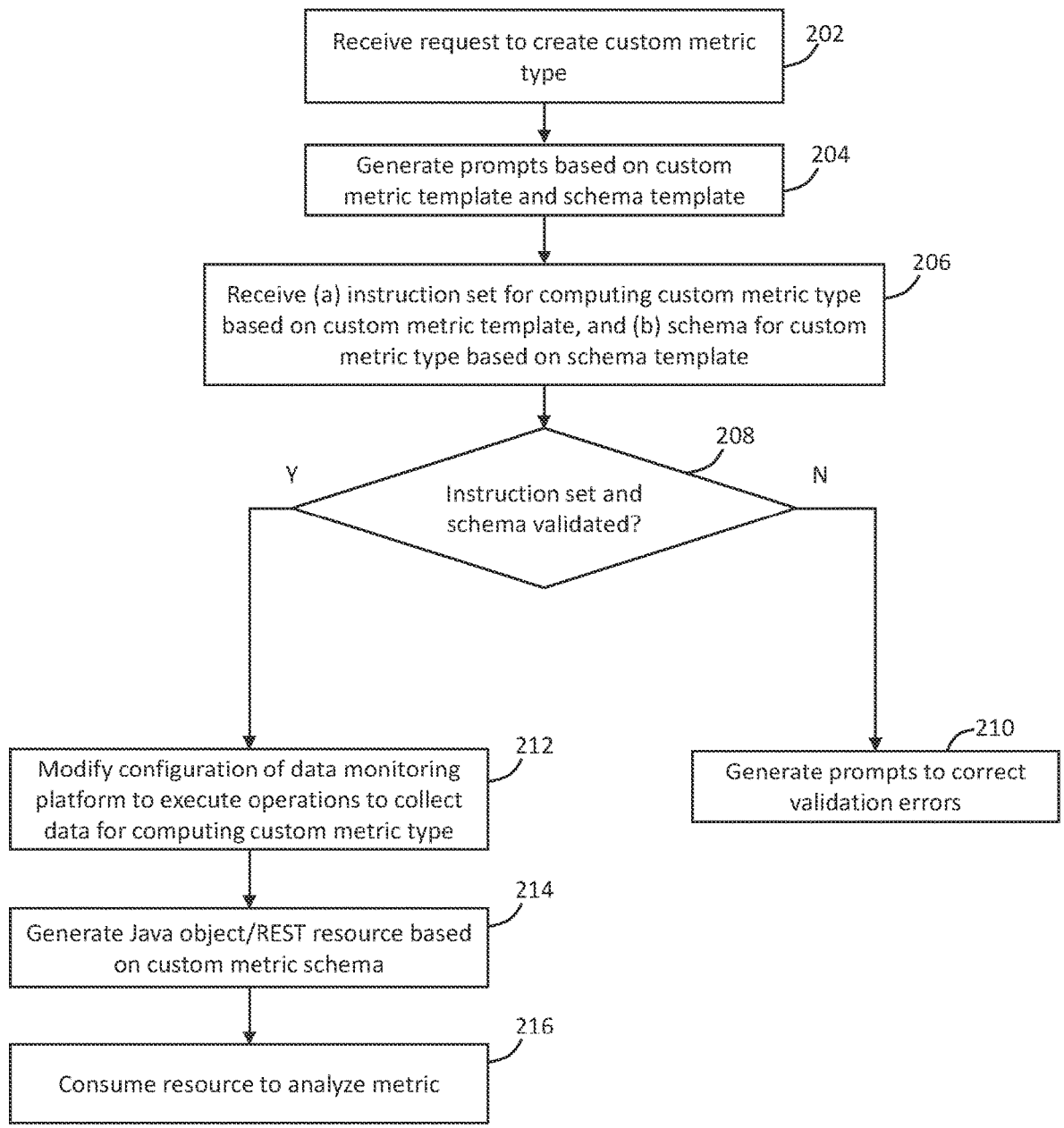
FIG. 2 illustrates an example set of operations for generating a custom metric type in a currently-executing data monitoring platform in accordance with one or more embodiments.

3. Generating Custom Metrics in a Currently-Executing Data Monitoring Platform FIG. 2 illustrates an example set of operations for generating custom metrics in a data monitoring platform in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system receives a request to create a custom metric type (Operation 202). In one embodiment, the system includes a data monitoring platform that monitors data and generates metrics based on the monitored data. The metrics include values found in the data or values calculated or formulated based on the data. The data may be time-series data. The data monitoring engine may be running and generating a set of defined metrics when the system receives the request to create the custom metric type.

According to one example, embodiment, the data monitoring platform comprises a software module stored in memory, and that executes on a hardware processor, to obtain data values from defined fields in a data set. The fields may be data stored in a data repository that is updated at predefined intervals based on data generated by components of a system. For example, in an embodiment in which a data monitoring platform is monitoring a server network, the server network may update fields of data objects in a data repository with values for: server activity, bandwidth of transmission media to and from the servers, applications running on servers, tenants active on servers, data traffic sources and destinations, a number of monitored servers, ID's of monitored servers, and any other data an operator configures the data monitoring platform to monitor. In one embodiment, the system receives the request to create the custom metric type based on determining that one or more new fields have been added to the set of fields accessible by the data monitoring platform. For example, a system may be modified to monitor a new attribute, such as server queue size or latency along a transmission path between a server and another system component. A metric may not exist that reflects the new attribute associated with the one or more new fields. According to an example, embodiment, when a new field is detected, the system may generate a prompt to determine whether an entity accessing the data monitoring platform wants to create a new metric type based on the one or more new fields.

The system generates prompts based on a custom metric type template and a custom metric schema template (Operation 204). The custom metric type template specifies types that are to be used to compute the custom metric type. In one embodiment, the types are classes that may be instantiated to generate objects.

In one or more embodiments, the system generates prompts as user interface elements in a graphical user interface (GUI). For example, the GUI may include a field entitled "Name" in which an entity may enter a name for a custom metric type. The GUI may include a field entitled "Fields" where a user specifies which fields of a data set will be accessed by the custom metric type to generate values for the custom metric. The GUI may include a field entitled "Calculation" where a user specifies a mathematical or logical formula applied to values in the identified fields of the data set to generate values for the custom metric. The GUI may include a field entitled "value" where a user specifies a value type for the custom metric type. The GUI may include fields for a schema including a "name" and a "value." The fields for the schema may include additional properties associated with the custom metric type. The GUI may include an interface element representing completion of defining the custom metric type. When an entity selects the "completion" interface element, the system may provide an instruction set based on the custom metric template data and a schema based on the custom schema template to validation modules to validate the form and content of the instruction set and the schema.

The system receives the instruction set for computing a custom metric type based on the custom metric template (Operation 206). For example, the instruction set may be generated based on user responses to the prompts based on the custom metric template. The system also receives a custom schema for the custom metric type based on the custom schema template (Operation 206). In one or more embodiments, the types specified in the custom metric schema may be types that are not currently used by a currently-executing data monitoring platform to generate a metric among a set of metrics currently generated by the data monitoring platform. In an alternative embodiment, the types specified in the custom metric schema may be types that are currently used by the currently-executing data monitoring platform to generate one or more metrics in the metric set. However, the instruction set may include one or more formulae applied to the types to generate a custom metric that is not currently generated by the currently-executing data monitoring platform. For example, the data monitoring system may have access to fields including values for a number of customers accessing an endpoint in a system and a latency along transmission paths in the system. The custom metric may include a new formula, not used previously in any metric of the executing data monitoring system, for representing a relationship between the number of customers accessing the endpoint and the latency along the transmission paths in the system. In one or more embodiments, the custom schema is a JavaScript Object Notation (JSON) schema.

In one embodiment, the currently-executing data monitoring platform includes an application programming interface (API). The system receives the instruction set for computing the custom metric type and the custom metric schema via a POST command to a Representational State Transfer (REST) endpoint. The REST endpoint may run concurrently with a metric generation engine and a metric analysis engine. A user may interface with a GUI at a user terminal input parameter values, such as a metric name, data set fields, and a metric type, for the custom metric. The user interface may generate a POST command via a REST API to (a) generate a new metric type to be generated by a metric generation engine, and (b) generate the metric schema to be consumed by the metric analysis engine. The metric generator that generates the custom metric based on the custom metric template exposes a function of the API to modify the set of metrics generated by the data monitoring platform. The metric generator provides the instruction set for the custom metric type to the data monitoring platform.

The system determines if the instruction set and the schema may be validated (Operation 208). For example, the system analyzes the types specified in the instruction set to ensure the types are valid types available to the system for collecting data. The system also determines whether the structure of the schema is a valid structure that may be processed by the system to modify a currently-executing data monitoring platform. The currently-executing data monitoring platform is a device or system that collects sets of data, such as time-series data generated by a monitored system, and generates metrics according to pre-defined metric types specified in the code of the data monitoring platform. The metrics include values obtained from collected data as well as metrics obtained by applying one or more formulae to collected data.

In one or more embodiments, determining if the instruction set and the schema may be validated includes detecting malicious or harmful functions in the instruction set and the schema. For example, the system may identify a particular function as being capable of crashing, hijacking, or slowing operation of an executing data monitoring program. The system may identify an authorization level associated with an instruction set and determine that particular fields specified in the instruction set cannot be accessed based on the authorization level. For example, the system may generate metadata associated with an entity initiating the request to generate the custom metric type. The metadata may specify the authorization level for the entity. The authorization level may determine the fields accessible to the entity and computations that may be implemented by the entity to generate custom metrics.

According to one or more embodiments, validating the custom metric template and the schema template includes translating the custom metric template and the schema template into source code.

If the system determines that one or both of the instruction set and the schema cannot be validated, the system generates prompts to correct the validation errors (Operation 210). For example, if the system determines that a type specified in the instruction set is not a type that is available to the system for collecting data, the system may prompt a user to modify the type or delete the type.

If the system determines that both the instruction set and the schema are validated, the system modifies a configuration of the data monitoring platform (Operation 212). Using the custom schema, the data monitoring platform modifies the set of metrics generated by the data monitoring platform to include the custom metric of the custom metric type. In one or more embodiments, the system modifies the set of metrics generated by the currently-executing data monitoring system without re-compiling code associated with the data monitoring system and without re-deploying the code associated with the data monitoring system. In the example embodiment in which the data monitoring platform includes a software module stored in memory, and that executes on a hardware processor, the data monitoring platform may define a process by which a set of objects associated with a corresponding set of metrics is generated each time the process is executed. For example, the process for generating a set of values associated with the set of metrics may include generating a queue of processes, each process specifying a metric to be generated based on specified data of a data set and/or computations applied to the data. According to one embodiment, modifying the configuration of the data monitoring platform includes adding a process for generating the custom metric of the custom metric type to the queue of processes for generating the set of metrics.

In an embodiment, the data monitoring platform includes a predefined set of operations for retrieving data, performing computations, storing data, etc. These predefined operations do not specify certain attributes such as the target device from which the data is received, the operator to be used in performing the computation, or a destination where data is to be stored. The system accepts these missing attributes as parameters based on the completed templates and thereafter executes the operations based on the attributes. Furthermore, the data in the completed template may be used to select a subset of the predefined operations that are to be executed for generating the custom metrics.

According to one or more embodiments, the system modifies the source code for the data modification platform with the source code generated based on the custom metric template and the schema template. The system modifies the source code for the data modification platform without re-compiling or re-deploying the code for the data monitoring platform.

The system uses the custom schema to generate one or both of an object (such as a Java object), and a REST resource (Operation 214). The Java object and/or the REST resource include values associated with the custom metric. For example, the Java object and/or the REST resource include values obtained by applying a formula specified in the instruction set for computing the custom metric type to collected data specified by the custom metric type. By generating the Java object and/or REST resource based on the custom metric schema, the values for the custom metric are made available, together with values for the previously-generated set of metrics, to entities in communication with the data monitoring system. The custom metric type has the same type of functionality as previously-existing metrics. For example, the system may call, analyze values of, and perform calculations with a Java object associated with a custom metric in a same manner as Java objects associated with existing metrics.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
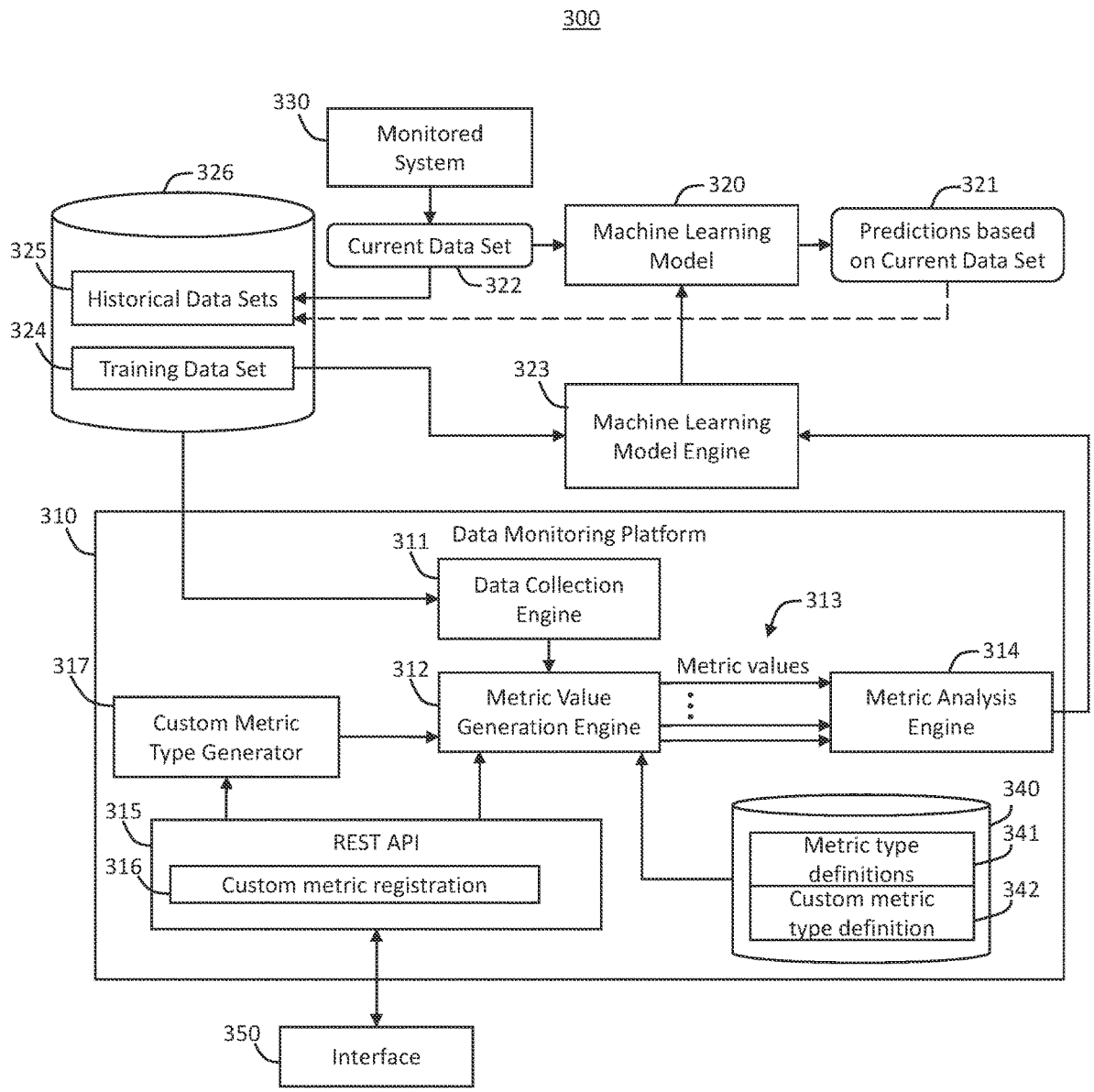
FIGS. 3A and 3B illustrate an example embodiment for generating a custom metric type in a currently-executing data monitoring platform.
Figure 3B:
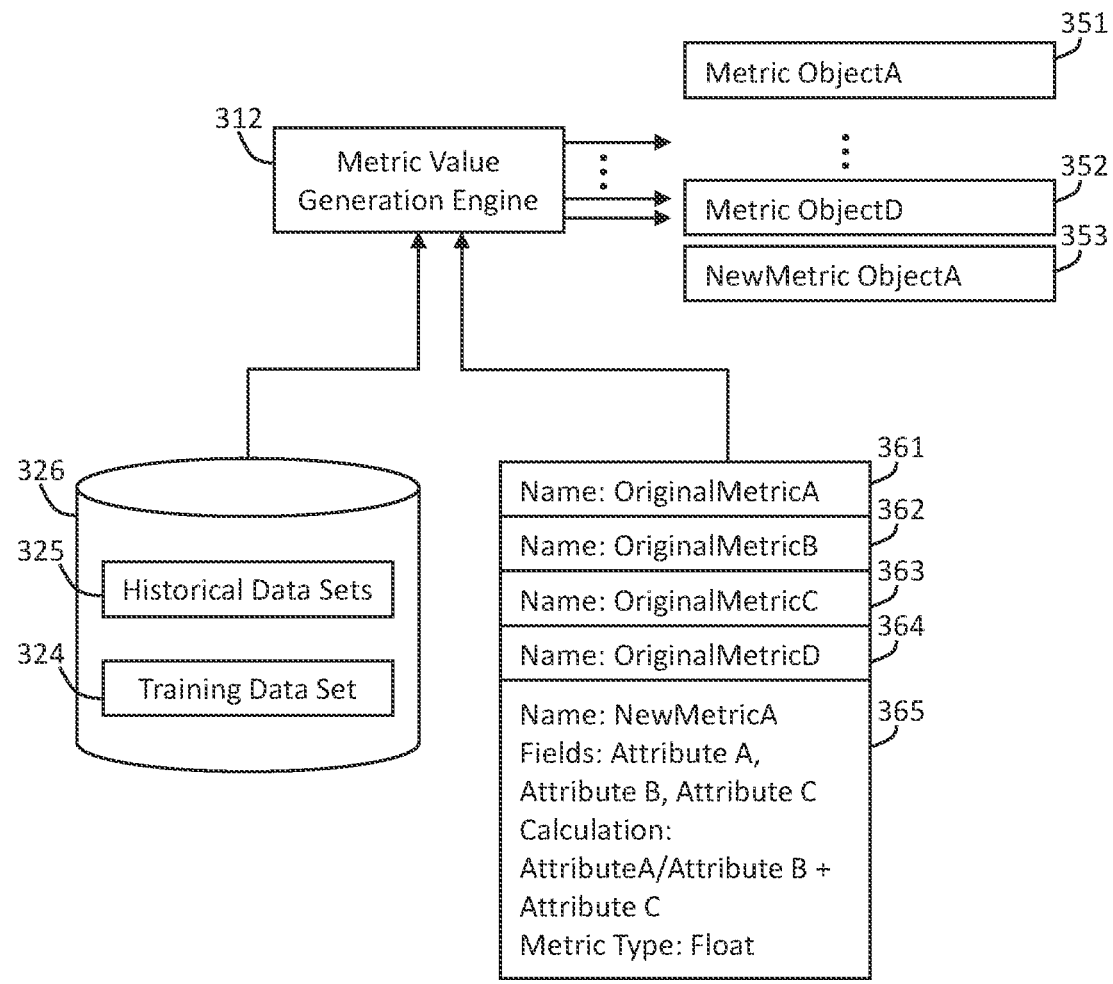

FIGS. 3A and 3B illustrate an example embodiment of a machine learning monitoring system 300 capable of generating custom metrics for monitoring a machine learning model at run-time, without bringing down the monitoring system or re-deploying the monitoring system. The system 300 includes a data monitoring platform 310 that monitors a machine learning model 320. The machine learning model 320 generates predictions 321 based on a current data set 322 output by a monitored system 330.

The machine learning model 320 generates predictions associated with the monitored system 330, such as predicting future system states, predicting anomalies, and generating recommendations for reconfiguring the monitored system 330 (e.g., adding, removing, modifying components in the monitored system 330). The data set 322 may include any type of data associated with the monitored system, including sensor data, state data of computer components, data describing data content and data transmission in the system, and environmental data of an environment associated with the monitored system 330.

A machine learning model engine 323 trains the machine learning model 320 to generate the predictions 321 based on a training data set 324. The training data set includes, for example, historical data points associated with the monitored system and labels associated with the data points. For example, a data point may include sensor values and state values of components in the system and a label indicating either an expecting operating state or an anomalous operating state.

As time passes and the machine learning model 320 is repeatedly applied, over time, to current data sets 322 to generate predictions 321, the current data sets and predictions may be stored as historical data sets 325. The data monitoring platform 310 includes a data collection engine 311. The data collection engine collects the training data set 324 and the historical data sets 325. The data monitoring platform 310 monitors variations between the training data set 324 and the historical data sets 325 to determine whether the machine learning model 320 is still effective at generating predictions 321.

The data collection engine 311 provides data from the training data set 324 and the historical data sets 325 to a metric value generation engine 312 to generate metrics 313 associated with the monitored system 330. For example, the metric value generation engine 312 may run a program to (a) read from a data repository 340 a set of metric definitions 341, (b) request attributes associated with the metric definitions 341 from the data collection engine 311, (c) perform any calculations, specified by the metric definitions, on corresponding attribute values, and (d) output the resulting metric values to a metric analysis engine 313. The processes (a)-(d) may be performed by executing processes in a process queue. For example, the metric value generation engine 312 may be programmed to generate metric values for a set of metrics based on a set of processes in a process queue. The set of processes may be defined based on the metric definitions 341, including what data to obtain from which data objects, and what functions to perform on the data to generate metric values.

As an example, a metric definition may specify: "Calculate the average data output per hour of component X over a period of one day." The metric definition may specify attribute "data output" for times t1-t60 and a calculation "AVG (t1-t60)." The metric definition may specify that the location of the attribute is in a data object located in the historical data set 325. Another metric definition may specify the same metric associated with the training data set 324. The metric analysis engine 314 may compare the metric values 313 corresponding to the two metrics to determine whether a variation in the historical data set from the training data set exceeds a threshold, indicating the current data sets 322 are drifting from the training data set 324, which may affect the accuracy of the predictions 321 generated by the machine learning model 320. If the metric analysis engine 314 determines that the historical data sets 325 differ from the training data set 324 beyond a threshold level, the metric analysis engine 314 may instruct the machine learning model engine 323 to retrain the machine learning model 320 based on a predefined subset of the historical data sets 325. Alternatively, the metric analysis engine 314 may generate a notification or recommendation for a user to control the machine learning model engine 323 to retrain the machine learning model 320.

A developer may develop the data monitoring platform 310 based on the particular monitored system 330. For example, if a monitored system 330 includes data stored in a database—such as personnel data—a developer writes code to specify metric definitions associated with attributes in the personnel data, such as a number of employees in a database, a position of employees, hire dates, termination dates, salaries, departments, evaluation ratings, etc. The developer 312 writes code to cause the metric value generation engine 312 to generate metric values 313 based on the particular metric definitions 341 associated with the personnel data stored in the personnel database. The metric analysis engine 314 analyzes the changes in the metrics over time. In particular, the metric analysis engine 314 monitors how metric values generated based on historical data sets as the personnel data is changed and updated varies from the personnel data used to train the machine learning model 320.

As another example, if the monitored system is a cloud computing environment, the developer writes code to specify metric definitions 341 associated with attributes of components in the cloud computing environment. Examples of attributes associated with components of a cloud computing environment include data transmission rates, data storage capacity, data loss rates, a number of components in the environment, clients associated with the environment, etc. The developer 312 writes code to cause the metric value generation engine 312 to generate metric values 313 based on the particular metric definitions 341 associated with the attributes of the components of the cloud computing environment. The metric analysis engine 314 analyzes the changes in the metrics over time. In particular, the metric analysis engine 314 monitors how metric values generated based on historical data sets, as the cloud computing environment operates, vary from the cloud computing environment data used to train the machine learning model 320.

The data monitoring platform 310 continually and repeatedly monitors the effectiveness of the machine learning model 320 based on the attributes of the historical data sets 325 and the training data set 324.

According to one or more embodiments, a user may generate new custom metrics during operation of the data monitoring platform 310, without stopping operation of the data monitoring platform 310 and without redeploying the data monitoring platform 310. The data monitoring platform 310 generates a custom metric type that is added to a set of metrics generated by the metric value generation engine 312 at run-time, without terminating the ongoing execution of the data monitoring platform 310. For example, the metric value generation engine 312 may generate values for a set of existing metrics by executing a corresponding set of metrics-calculation processes from a process queue. One or more embodiments generate, at run-time, a custom metric process that is added to the process queue to generate custom metric values for the custom metric.

The metric value generation engine 312 generates values for metrics based on data attributes of data objects among the training data set 324 and the historical data set 325. In one embodiment, the new custom metric type specifies one or more attributes that were not previously used to generate any metric. For example, a developer may program the data monitoring platform 310 to monitor the machine learning model 320 by detecting a variation in values associated with a number of components in a cloud computing environment and data transmission capacity in the cloud computing environment. At run-time, a user may further monitor the machine learning model 320 by creating a new custom metric that measures the run state of applications, such as "running" and "not responding." An output value for the custom metric may be a Boolean value 0 or 1. The attribute "ApplicationState" may be among the attributes for which values are obtained and stored in the data repository 326. However, the attribute "ApplicationState" may not have previously been used in any metric generated by the metric value generation engine 312. According to an alternative embodiment, a custom metric may accept as input parameters used to calculate an output value: (a) other metric values of other metrics, (b) attribute values that were already used in another metric to calculate an output value, and (c) prediction values of predictions 321 generated by the machine learning model 320.

The metric value generation engine 312 generates the custom metric type based on receiving an instruction set specifying instructions for computing the custom metric type and a custom metric schema specifying properties of a data object associated with the generated custom metric.

The system 300 includes an interface 350 to allow a user or entity to perform functions specified by a REST API 315. Specifically, the REST API includes a function 316 to allow the user or entity to register a custom metric type. The function 316 receives as values parameters defining the custom metric type. In particular, the parameters include a name for the custom metric type, data sources from which values are retrieved to generate the custom metric type, functions performed on the obtained values to generate the custom metric type, and a type of output value associated with the custom metric type. For example, one custom metric type may generate a float-type value, another a double-type value, another a Boolean-type value, and another a character (e.g., ASCII character)-type value.

According to one embodiment, the interface 350 includes a graphical user interface (GUI), and the data monitoring platform 310 provides a custom metric template to the interface 350. For example, the GUI may display fields for parameters defining the custom metric type, such as "name," "attributes," "calculation," and "metric output type" with which a user may interface to provide values to define the new custom metric. The interface 350 provides the parameters associated with the custom metric to the data monitoring platform 310. The data monitoring platform 310 generates a set of instructions for generating the custom metric type and an object schema. A custom metric type generator 317 receives the parameters to generate a new custom metric type 317 and generates the set of instructions for generating the custom metric type. The custom metric type generator 317 validates the set of instructions for generating the custom metric type. The custom metric type generator 317 determines that the values provided to identify fields accessed to obtain the data to generate the custom metric type exist and are accessible by a data collection engine. For example, the custom metric type generator 317 may analyze data objects in the training data set 324 and the historical data sets 325 to identify attributes or fields associated with attributes specified in the set of instructions for the custom metric type. If the custom metric type obtains a value from attributes "userID" and "accessDuration," the custom metric type generator 317 searches the data objects in the data repository 326 to ensure the data objects include attributes "userID" and "accessDuration." The custom metric type generator 317 determines that the value type associated with the custom metric is a valid value type. Based on validating the parameters of the custom metric type, the custom metric type generator 317 stores a new metric type definition 342 for the custom metric type in the data repository 340.

The metric value generation engine 312 also receives instructions specifying a schema for an object associated with the custom metric type. The custom metric schema may be, for example, a JavaScript Object Notation (JSON) language schema. The schema specifies the metric name and metric value return type (e.g., float, character, Boolean, etc.). The metric value generation engine 312 validates the schema. For example, the metric value generation engine 312 may ensure the name is a unique metric name and the metric value return type is a valid type. Based on validating the schema, the metric value generation engine 312 modifies a set of instructions for generating metric values to include in the set of instructions and the schema corresponding to the custom metric type. Based on the validated custom metric type (by the custom metric type generator 317) and the validated custom metric schema (by the metric value generation engine 312), the next time the metric value generation engine 312 calls the process to generate the metric values 313, the custom metric type is included in the process queue of the metric typees for which the metric value generation engine 312 generates metric values. The metric value generation engine generates one or both of a Java object and a REST resource using the custom JSON schema associated with the custom metric type.

As illustrated in FIG. 3B, the metric value generation engine 312 generates metric values for Metric ObjectA 351 through Metric Object D 352 based on attribute values obtained from the historical data sets 325 and the training data set 324. The metric value generation engine 312 generates metric values for Metric ObjectA 351 through Metric Object D 352 based on attribute values specified in metric type definitions 361-364. The metric type definitions 361-364 include the attributes in the historical data sets 325 and the training data set 324 used to generate metric values, and the functions performed on the attribute values to generate the metric values. Upon creating a new metric type, the data monitoring platform 310 modifies instructions for the metric value generation engine 312 to include the custom metric associated with the custom metric type definition 365 in a process queue for generating metrics. For example, the metric value generation engine 312 may be programmed to run the following processes: [names/locations of metric type definitions]. The custom metric type definition may be added to the set of metric type definitions included in the [names/locations of metric type definitions].

The data monitoring platform 310 is a currently-executing platform that collects data and generates metrics. Prior to receiving the custom metric type, the data monitoring platform 310 is generating values for a set of metrics. The custom metric type and custom metric schema modify instructions in the metric value generation engine 312 at run-time to generate the custom metric without re-compiling code for the data monitoring platform 310 and without re-deploying the code for the data monitoring platform 310.

5. Computer Networks and Cloud Networks

In one or more embodiments, the data monitoring platform comprises, or is connected to one or more of the custom metric registration engine, the custom metric type generator, the data repository, and the data source via a computer network. A computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
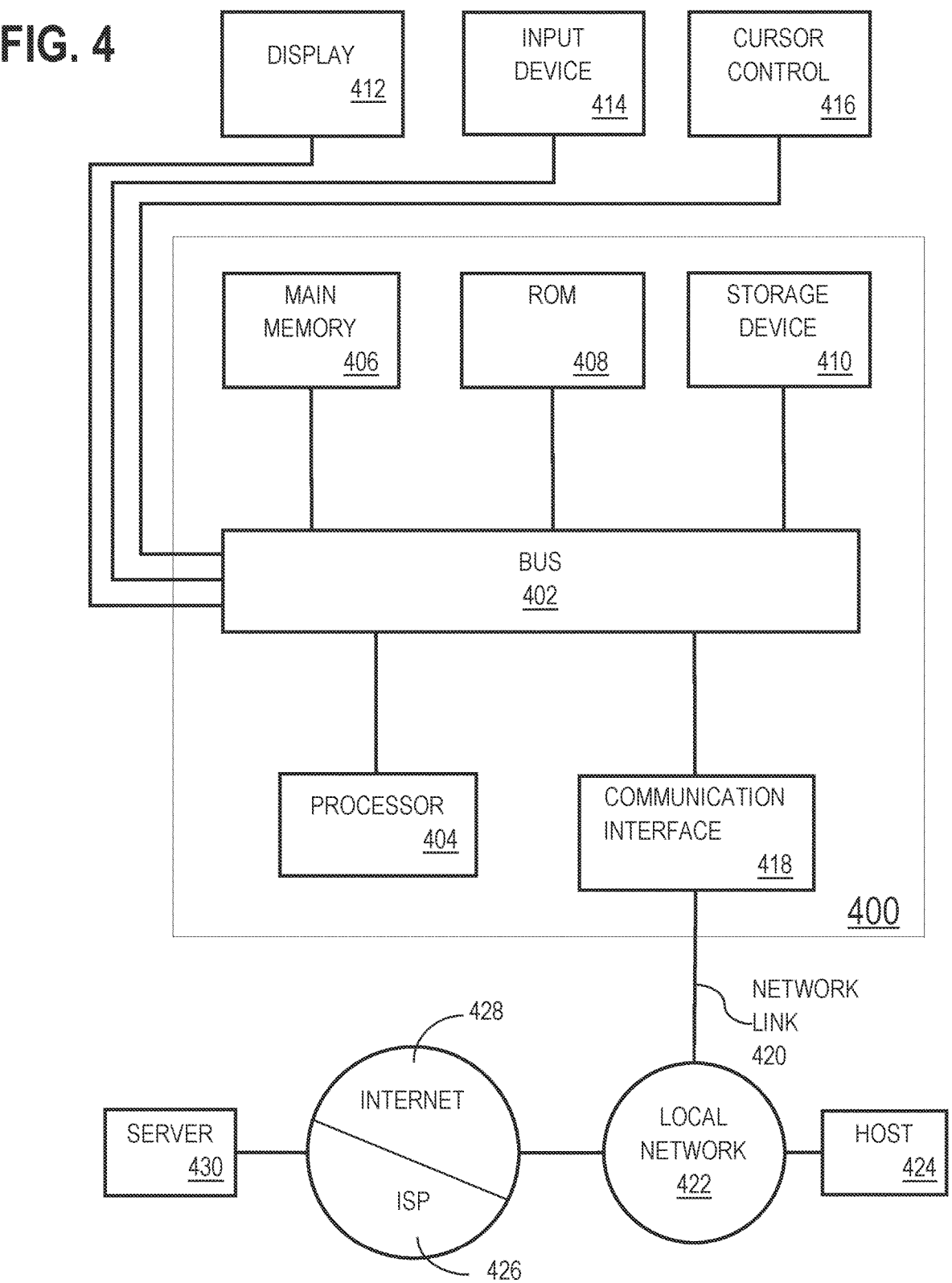
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors cause performance of operations comprising:
    collecting, by an executing data monitoring platform, a first set of system data by executing a first set of operations in accordance with a first configuration of the executing data monitoring platform;
    based on the first set of system data, generating, by the executing data monitoring platform, a first set of metrics representing the first set of system data, wherein each metric among the first set of metrics is characterized by (a) a particular schema specifying particular system data used to calculate the metric, and (b) a particular instruction set specifying a particular set of calculations to perform to calculate the metric using the particular system data;
    receiving, at run-time of the executing data monitoring platform, a request to reconfigure the executing data monitoring platform to generate a custom metric of a custom metric type, the request comprising:
        (a) a schema for a custom metric type representing system data collected by an executing data monitoring platform, the schema defining fields of the custom metric type; and
        (b) an instruction set specifying a set of calculations for computing the custom metric type using a subset of the system data corresponding to the fields of the custom metric type, the instruction set further specifying one or more types used to compute the custom metric type;
    obtaining, at run-time, by an executing data monitoring platform, information corresponding to the instruction set and the schema for computing the custom metric type;
    modifying, at run-time, by the executing data monitoring platform, the first configuration of the executing data monitoring platform to generate a second configuration of the executing data monitoring platform, the second configuration specifying a second set of operations to collect data necessary for computing the custom metric type;
    collecting, by the executing data monitoring platform, a second set of system data by executing the second set of operations in accordance with the second configuration of the executing data monitoring platform; and
    based on the second set of system data, generating, by the executing data monitoring platform, a second set of metrics representing the second set of system data, the second set of metrics including the custom metric,
    wherein the custom metric is computed by executing the instruction set, received in the request at run-time, using the second set of system data.

2. The non-transitory computer readable medium of claim 1, wherein subsequent to modifying the executing data monitoring platform, the custom metric type is added to a collection of metric types maintained by the data monitoring platform and available for selection by users.

3. The non-transitory computer readable medium of claim 1, wherein the operations further comprise:
    instantiating objects of the custom metric type, the objects comprising information that is computed using the instruction set based on the data collected by the executing data monitoring platform.

4. The non-transitory computer readable medium of claim 1, wherein receiving the request comprises receiving the schema and the instruction set within respective templates for the schema and the instruction set.

5. The non-transitory computer readable medium of claim 4, wherein the request is received based on a prompt corresponding to the templates.

6. The non-transitory computer readable medium of claim 1, wherein the operations further comprise:
    prior to receiving the request, transmitting a template for the schema and the instruction set.

7. The non-transitory computer readable medium of claim 1, wherein the one or more types are not used for computation of any metrics currently generated by the data monitoring platform.

8. The non-transitory computer readable medium of claim 1, wherein the instruction set comprises an operation which accepts one or more values as input parameters, an operator parameter which is to be applied to the values, and a return type.

9. The non-transitory computer readable medium of claim 8, wherein the operation finds the operation type to be performed based on the operator parameter.

10. The non-transitory computer readable medium of claim 1, wherein the instruction set for the custom metric type includes a formula applied to values associated with the one or more types used to compute the custom metric type.

11. The non-transitory computer readable medium of claim 1, wherein modifying the first configuration of the executing data monitoring platform to execute the operations to collect the data necessary for computing the custom metric type is performed without compiling code of the data monitoring platform and without redeploying the code of the data monitoring platform.

12. The non-transitory computer readable medium of claim 1, wherein the schema is a JavaScript Object Notation (JSON) schema.

13. The non-transitory computer readable medium of claim 1, further comprising: generating, by the data monitoring platform, a Java object based on the custom metric type.

14. A method, comprising:
    collecting, by an executing data monitoring platform, a first set of system data by executing a first set of operations in accordance with a first configuration of the executing data monitoring platform;
    based on the first set of system data, generating, by the executing data monitoring platform, a first set of metrics representing the first set of system data, wherein each metric among the first set of metrics is characterized by (a) a particular schema specifying particular system data used to calculate the metric, and (b) a particular instruction set specifying a particular set of calculations to perform to calculate the metric using the particular system data;
    receiving, at run-time of the executing data monitoring platform, a request to reconfigure the executing data monitoring platform to generate a custom metric of a custom metric type, the request comprising:
        (a) a schema for a custom metric type representing system data collected by an executing data monitoring platform, the schema defining fields of the custom metric type; and (b) an instruction set specifying a set of calculations for computing the custom metric type using a subset of the system data corresponding to the fields of the custom metric type, the instruction set further specifying one or more types used to compute the custom metric type;

obtaining, at run-time, by an executing data monitoring platform, information corresponding to the instruction set and the schema for computing the custom metric type;

modifying, at run-time, by the executing data monitoring platform, the first configuration of the executing data monitoring platform to generate a second configuration of the executing data monitoring platform, the second configuration specifying a second set of operations to collect data necessary for computing the custom metric type;

collecting, by the executing data monitoring platform, a second set of system data by executing the second set of operations in accordance with the second configuration of the executing data monitoring platform; and based on the second set of system data, generating, by the executing data monitoring platform, a second set of metrics representing the second set of system data, the second set of metrics including the custom metric, wherein the custom metric is computed by executing the instruction set, received in the request at run-time, using the second set of system data.

15. The method of claim 14, wherein subsequent to modifying the executing data monitoring platform, the custom metric type is added to a collection of metric types maintained by the data monitoring platform and available for selection by users.

16. The method of claim 14, further comprising:
instantiating objects of the custom metric type, the objects comprising information that is computed using the instruction set based on the data collected by the executing data monitoring platform.

17. The method of claim 14, wherein receiving the request comprises receiving the schema and the instruction set within respective templates for the schema and the instruction set.

18. The method of claim 17, wherein the request is received based on a prompt corresponding to the templates.

19. The method of claim 14, further comprising:
prior to receiving the request, transmitting a template for the schema and the instruction set.

20. A system comprising:
one or more processors; and
memory storing instructions that, when executed by the one or more processors, cause the system to perform operations comprising:

collecting, by an executing data monitoring platform, a first set of system data by executing a first set of operations in accordance with a first configuration of the executing data monitoring platform;

based on the first set of system data, generating, by the executing data monitoring platform, a first set of metrics representing the first set of system data, wherein each metric among the first set of metrics is characterized by (a) a particular schema specifying particular system data used to calculate the metric, and (b) a particular instruction set specifying a particular set of calculations to perform to calculate the metric using the particular system data;

receiving, at run-time of the executing data monitoring platform, a request to reconfigure the executing data monitoring platform to generate a custom metric of a custom metric type, the request comprising:

(a) a schema for a custom metric type representing system data collected by an executing data monitoring platform, the schema defining fields of the custom metric type; and (b) an instruction set specifying a set of calculations for computing the custom metric type using a subset of the system data corresponding to the fields of the custom metric type, the instruction set further specifying one or more types used to compute the custom metric type;

obtaining, at run-time, by an executing data monitoring platform, information corresponding to the instruction set and the schema for computing the custom metric type;

modifying, at run-time, by the executing data monitoring platform, the first configuration of the executing data monitoring platform to generate a second configuration of the executing data monitoring platform, the second configuration specifying a second set of operations to collect data necessary for computing the custom metric type;

collecting, by the executing data monitoring platform, a second set of system data by executing the second set of operations in accordance with the second configuration of the executing data monitoring platform; and based on the second set of system data, generating, by the executing data monitoring platform, a second set of metrics representing the second set of system data, the second set of metrics including the custom metric, wherein the custom metric is computed by executing the instruction set, received in the request at run-time, using the second set of system data.

* * * * *